Oct. 9, 1951     D. F. CHRISTOFFER     2,570,321
SCALE FOR TIGHTENING CORN PLANTER WIRES
Filed Aug. 6, 1948
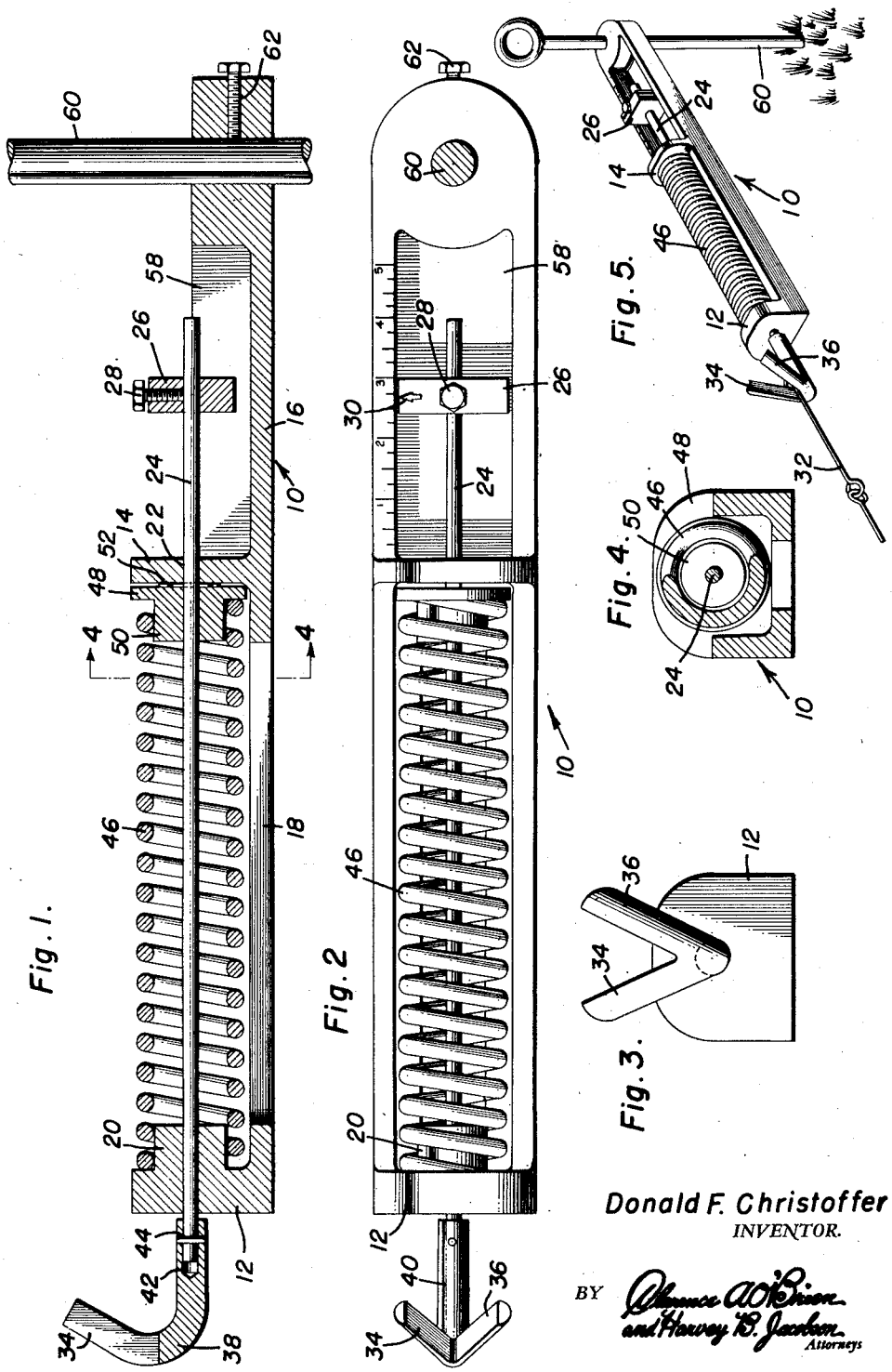
Donald F. Christoffer
INVENTOR.

Patented Oct. 9, 1951

2,570,321

UNITED STATES PATENT OFFICE 2,570,321

SCALE FOR TIGHTENING CORN PLANTER WIRES

Donald F. Christoffer, Spirit Lake, Iowa

Application August 6, 1948, Serial No. 42,967

3 Claims. (Cl. 73—143)

This invention appertains to novel and useful improvements in devices for measuring the tension of wires for use in corn planting or other types of planting of crops which utilize the commonly known checkrow wires.

An object of this invention is to supply an apparatus for tightening a successive checkrow wire a preselected amount, which apparatus includes a frame having at least one end wall and a spaced intermediate wall, a rod slidably positioned in both of said walls with means for resiliently urging said rod in a predetermined direction, said rod having a stop attached adjacent one end in an adjustable manner and checkrow wire retaining prongs at the opposite end, and indicia suitably placed in order to determine the tension of the checkrow wire.

Another object of this invention is to support the above described members above the ground by means of a corn planter stake.

Another object of this invention is to project a stake through the frame and frictionally retain the stake at a preselected position relative to the longitudinal axis of the frame.

Another object of this invention is to improve generally the class of implements which are used for somewhat similar purposes.

Ancillary objects and features of novelty will become apparent to those skilled in the art, in following the description of the preferred form of the invention, illustrated in the accompanying drawings, wherein:

Figure 1 is a longitudinal sectional view of a preferred form of the invention;

Figure 2 is a plan view of the invention shown in Figure 1;

Figure 3 is an end view of the device shown in Figure 2;

Figure 4 is a sectional view taken substantially on the line 4—4 of Figure 1 and in the direction of the arrows; and Figure 5 is a perspective view showing the invention in use.

There is one check wire used in checkrow planting of corn and other checkrow crops. The check wire has buttons equally spaced thereon, that trip the planters, which planters then drop seed in hills formed in the ground. This wire is secured on each end of the field by means of a so-called planter stake or post. Each time the planter is turned around at the end of the field, the planter stake or post is pulled from the ground and moved over to a position behind the planter. The checkrow wire is then pulled tight and the stake is urged into the ground. This procedure is repeated at each end of the field.

Now, if the checkrow wire is not pulled to the same tension each time, the buttons on the wire will trip the planter mechanism too soon or too late and consequently the seeds will not line up with the seeds previously dropped and the result will be crooked crossed rows of crop, whether it be corn or any other type of crop.

It is therefore one of the prime purposes of the present invention to place an identical device on each end of the field by means of corn planter stakes, which are generally a portion of the equipment furnished with corn planters. Then, the scales are fastened to the stakes with set screws or other suitable friction securing means provided in association with and forming a portion of the invention. After this fastening operation takes place, the check wire is hooked in the wire attaching means which in this instance are forked prongs. The set screw on the device is loosened and the wire is then pulled to the tension desired by the user of the device and the adjustable stop, block or marker 26 is then moved forward to an intermediate wall 14 and the set screw therein is then tightened which leaves the stop in a fixed position.

When the stake or post is pulled from the ground, the marker is urged back as tension is then taken off the spring which is provided for this purpose.

When the stake is moved to a new position for resetting, the checkrow wire is pulled until the stop is forward where it was previously set and the stake is then pushed into the ground again. In this manner the wire is tensioned the same amount each time the stake is moved to a new position and consequently, the seeds will be dropped at the proper time and the resulting rows of crop will be properly arranged.

In order to check the scales to see whether the scales at each end of the field are set at the proper tension, a visual indicator is supplied in association with each device, forming a portion of the invention.

As is seen in Figure 1 there is provided a frame generally indicated at 10 which has an end wall 12 and an intermediate wall 14 integral therewith. Further, these walls project from the upper surface of the bottom member 16 of the said frame and there is a longitudinal slot 18 provided between both walls 14 and 16.

The said wall 12 has a protuberance 20 integral therewith and a bore extending not only through the wall 12 but also through the protuberance. An aligned bore 22 is provided in the intermediate wall 14 and a rod 24 is slidably positioned in both bores.

This rod has a block or marker 26 adjustably secured thereon through the medium of a set screw 28 or other suitable, equivalent means. The said marker is adjustable longitudinally of the rod 24 and may have an indicator 30 engraved or otherwise formed thereon.

Means for maintaining one of the ends of a conventional check row wire 32 is provided at the opposite end of the said rod 24. The preferable means consists of a pair of divergent prongs 34 and 36 which have a substantially V-shaped opening therebetween. Integral with the prongs is an arcuate portion 38 which terminates in a shank 40 having a bore 42 therein. This bore seats the terminal portion of the said rod 24 and a pin 44 extends through the rod adjacent its terminal portion and also through the end of the shank. Through this expedient the prongs are maintained rigid with the end of the rod 24.

Means for resiliently urging or biasing the said rod in a predetermined direction is provided. A preferable means consists of a conventional spring 46 extending around the said protuberance 20 and resting on the inner surface of the end wall 12. The opposite end of the spring engages a collar 48 which is slidably positioned on the said rod 24. This collar also has a protuberance 50 integral therewith which is identical to the said protuberance 20. Of course, said spring 46 encircles the said protuberance 50, reacting on the wider portion of the collar 48. In order to limit the travel of the collar 48 on the rod 24, a cotter pin 52 or other suitable equivalent is attached to the said rod 24.

A well or recess 58 is formed in the said frame 10 between the intermediate wall 14 and the end opposite the wall 12. This recess has the said marker 26 slidably received therein upon actuation of the rod 24. The walls defining the recess of course provide an excellent bearing surface for the block 26 in the event that a torque is applied to the rod 24. Also, one of the walls defining the said recess 58 may be used for the purpose of supporting suitable indicia, cooperating with the marker indicator 30.

A bore (unnumbered) is provided in the end portion of the frame 10 and carries a stake 60 therein. This stake is slidably received in the bore to selected positions and may be maintained firmly in place through the medium of a set screw 62 or other suitable equivalent clamping means. Thus, as is seen in Figure 5 the stake 60 is simply urged into the ground thereby firmly anchoring the device for the purpose of placing it in use as described previously.

It is apparent that certain variations may be made without departing from the spirit of the invention.

Having described the invention, what is claimed as new is:

1. A device for tightening check row wires a predetermined amount comprising a frame having an end wall and an intermediate wall, said walls having aligned apertures therein, a rod slidably mounted in said apertures, a spring seated on said end wall and reacting on said rod opposing the operation of said rod, means at one end of said rod for clampingly engaging a check row wire, a stop, means adjustably mounting said stop on said rod adjacent the opposite end thereof, a post, and means securing said post to said frame and in selected positions with relation to said frame.

2. In an apparatus for tightening a plurality of check row wires a preselected amount, a frame having an end wall and a spaced intermediate wall with an aperture therein, a protuberance associated with said end wall, said end wall and said protuberance having a passage extending therethrough, a rod extending through said passage and said aperture, a collar mounted on said rod, a compression spring seated on said collar and concentrically associated with said protuberance for resiliently urging said rod, prongs secured to one end of said rod and a marker selectively positioned on said rod adjacent the opposite end thereof, and means secured to said marker lockingly engaging said rod for maintaining said marker in a preselected position axially of said rod.

3. In an apparatus for tightening a plurality of check row wires a preselected amount, a frame having an end wall and a spaced intermediate wall with an aperture therein, a protuberance fixed to said end wall, said end wall and said protuberance having a passage extending therethrough, a rod extending through said passage and said aperture, a collar mounted on said rod, a compression spring seated on said collar and concentrically associated with said protuberance for resiliently opposing the operation of said rod, prongs secured to one end of said rod, and a marker selectively positioned on said rod adjacent the opposite end thereof, means secured to said marker lockingly engaging said rod for maintaining said marker in a preselected position on said rod, said frame having an opening therein, a post slidably positioned in said opening and extending through said frame, and means adjustable in said frame locking said post in predetermined positions relative to said frame.

DONALD F. CHRISTOFFER.

REFERENCES CITED

The following references are of record in the file of this patent:

UNITED STATES PATENTS

| Number | Name | Date |
| --- | --- | --- |
| 1,246,975 | Mertz | Nov. 20, 1917 |
| 1,247,007 | Reed | Nov. 20, 1917 |
| 1,247,249 | Felcyn | Nov. 20, 1917 |
| 1,344,131 | Hines | June 22, 1920 |
| 1,961,368 | Larson | June 5, 1934 |